United States Patent
Xiang et al.

(10) Patent No.: US 10,298,007 B2
(45) Date of Patent: May 21, 2019

(54) DIGITAL POWER SUPPLY PROTECTION CIRCUIT, AND APPARATUS

(71) Applicant: HUAWEI TECHNOLOGIES CO., LTD., Shenzhen, Guangdong (CN)

(72) Inventors: Li Xiang, Chengdu (CN); Xiaodong Fan, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 137 days.

(21) Appl. No.: 15/670,648

(22) Filed: Aug. 7, 2017

(65) Prior Publication Data

US 2017/0338647 A1 Nov. 23, 2017

Related U.S. Application Data

(63) Continuation of application No. PCT/CN2015/092190, filed on Oct. 19, 2015.

(30) Foreign Application Priority Data

Apr. 30, 2015 (CN) .......................... 2015 1 0220978

(51) Int. Cl.
*G06F 9/00* (2006.01)
*H02H 7/085* (2006.01)
(Continued)

(52) U.S. Cl.
CPC ........ *H02H 7/0858* (2013.01); *H02H 7/0838* (2013.01); *H02H 7/12* (2013.01);
(Continued)

(58) Field of Classification Search
CPC ...... H02H 7/0858; H02H 7/0838; H02H 7/12; H02M 1/40; H02M 3/337; H02M 1/32
(Continued)

(56) References Cited

U.S. PATENT DOCUMENTS 8,471,091 B1* 6/2013 Colbert .................... A01H 5/10
 800/260
9,214,851 B1* 12/2015 Mao ....................... H02M 1/08
(Continued)

FOREIGN PATENT DOCUMENTS

CN 101399500 A 4/2007
CN 101599701 A 12/2009
(Continued)

OTHER PUBLICATIONS

Chinese Office action dated Apr. 20, 2017 in corresponding application No. 201510220978.3.
(Continued)

*Primary Examiner* — Aurel Prifti
(74) *Attorney, Agent, or Firm* — Staas & Halsey LLP

(57) ABSTRACT

A digital power supply protection circuit includes: a signal preprocessing circuit, configured to receive an overcurrent signal and a first inceptive impulse clock timing, and perform preprocessing on the overcurrent signal according to the first inceptive impulse clock timing so as to obtain a first reference signal a signal generation circuit, configured to receive the first inceptive impulse clock timing, count time duration between a rising edge of the first inceptive impulse clock timing and a rising edge of the first reference signal so as to obtain a first time duration, and upon the first time duration is greater than a second time duration, generate a first disabling signal by delaying the rising edge of the first inceptive impulse clock timing for the second time duration; and a clock timing adjustment circuit, configured to adjust the first inceptive impulse clock timing according to the first disabling signal.

10 Claims, 8 Drawing Sheets

(51) Int. Cl.
  *H02H 7/12* (2006.01)
  *H02H 7/08* (2006.01)
  *H02M 1/40* (2007.01)
  *H02M 3/337* (2006.01)
  *H02M 1/32* (2007.01)

(52) U.S. Cl.
  CPC ............. *H02M 1/40* (2013.01); *H02M 3/337* (2013.01); *H02M 1/32* (2013.01)

(58) Field of Classification Search
  USPC ..................... 361/86, 93.1; 800/260; 363/16; 327/150
  See application file for complete search history.

(56) References Cited

U.S. PATENT DOCUMENTS

| | | | |
|---|---|---|---|
| 9,472,255 B2 * | 10/2016 | Kitagawa | G11C 5/063 |
| 10,025,345 B2 * | 7/2018 | Jeon | G06F 1/12 |
| 2002/0135342 A1 * | 9/2002 | Tomioka | H02M 3/33592 323/282 |
| 2011/0002068 A1 * | 1/2011 | Hu | H02M 1/32 361/18 |
| 2011/0175582 A1 | 7/2011 | Latham et al. | |
| 2014/0022684 A1 * | 1/2014 | Jiang | H02H 3/08 361/93.1 |
| 2014/0192560 A1 * | 7/2014 | Ou | H02M 1/40 363/16 |
| 2015/0236580 A1 * | 8/2015 | Jiang | H02M 3/1584 327/150 |
| 2015/0349519 A1 * | 12/2015 | Li | H02H 9/02 361/86 |
| 2018/0138797 A1 * | 5/2018 | Tsu | H02M 3/33523 |

FOREIGN PATENT DOCUMENTS

| | | |
|---|---|---|
| CN | 101867299 A | 10/2010 |
| CN | 101939899 A | 1/2011 |
| CN | 102751856 A | 10/2012 |
| CN | 102810974 A | 12/2012 |
| CN | 103780064 A | 5/2014 |
| CN | 103795228 A | 5/2014 |
| CN | 104242611 A | 12/2014 |
| CN | 104466890 A | 3/2015 |
| CN | 104836209 A | 8/2015 |
| JP | 9-19170 | 1/1997 |
| JP | 2004-357465 | 12/2004 |
| JP | 2008228491 | 9/2008 |
| JP | 2010161843 | 7/2010 |

OTHER PUBLICATIONS

International Search Report dated Jan. 26, 2016, in International Application No. PCT/CN2015/092190 (4 pages).
International Search Report dated Jan. 26, 2016, in International Application No. PCT/CN2015/092190 (5 pages).
Extended European Search Report, dated Nov. 8, 2017, in European Application No. 15890591.9 (19 pp.).

* cited by examiner

DIGITAL POWER SUPPLY PROTECTION CIRCUIT, AND APPARATUS

CROSS-REFERENCE TO RELATED APPLICATIONS

This application is a continuation of International Application No. PCT/CN2015/092190, filed on Oct. 19, 2015, which claims priority to Chinese Patent Application No. 201510220978.3, filed on Apr. 30, 2015, the disclosures of the aforementioned applications are hereby incorporated by reference in their entireties.

TECHNICAL FIELD

The present disclosure relates to the digital power supply field, and in particular, to a digital power supply protection circuit, and an apparatus.

BACKGROUND

In a direct current to direct current power conversion circuit, a bridge circuit is a common application circuit, and the bridge circuit includes a full bridge circuit and a half bridge circuit. The bridge circuit periodically works under control of an inceptive impulse clock timing, and each period is divided into the first half period and the second half period. A power switch in the bridge circuit is classified into two groups: a power switch that is switched on at a first time and a power switch that is switched on at a second time, and the two groups of power switches are switched on in different half periods.

As shown in FIG. 1, a typical full bridge circuit includes a first power switch, a second power switch, a third power switch, a fourth power switch, a transformer K1, a DC blocking capacitor C1, a first synchronous rectifier, a second synchronous rectifier, a sampling resistor R1, a filter inductor T1, and a load. A specific connection relationship is shown in FIG. 1. In the first half period of a period, the first power switch and the fourth power switch are switched on, and the second power switch and the third power switch are switched off. In the second half period of the period, the first power switch and the fourth power switch are switched off, and the second power switch and the third power switch are switched on. The first power switch and the fourth power switch are power switches that are switched on at the first time in the full bridge circuit, and the second power switch and the third power switch are power switches that are switched on at the second time in the full bridge circuit.

As shown in FIG. 2, a typical half bridge circuit includes a fifth power switch, a sixth power switch, a transformer K2, a DC blocking capacitor C2, a first synchronous rectifier, a second synchronous rectifier, a sampling resistor R1, a filter inductor T1, and a load. A specific connection relationship is shown in FIG. 2. In the first half period of a period, the fifth power switch is switched on, and the sixth power switch is switched off. In the second half period of the period, the fifth power switch is switched off, and the sixth power switch is switched on. The fifth power switch is a power switch that is switched on at the first time in the half bridge circuit, and the sixth power switch is a power switch that is switched on at the second time in the half bridge circuit.

For a bridge circuit, to maintain magnetic balance of a transformer, a DC blocking capacitor (such as the C1 in FIG. 1 and the C2 in FIG. 2) is generally connected in series on a primary side of the transformer, and a switch-on time duration of a power switch that is switched on at the first time and a switch-on time duration of a power switch that is switched on at the second time are controlled to be equal in each period, so that a charging time duration and a discharging time duration of the DC blocking capacitor connected in series on the primary side of the transformer are equal, thereby implementing magnetic balance of the transformer. However, when an overcurrent occurs in the bridge circuit, to implement magnetic balance of the transformer, the following technical solutions are generally used.

In the prior art, in a current period, when an overcurrent signal occurs within a switch-on time duration of a power switch that is switched on at the first time, an active level that controls the power switch that is switched on at the first time to a switch-on state is adjusted to an inactive level according to time of occurrence of the overcurrent signal; when no overcurrent signal occurs within a switch-on time duration of a power switch that is switched on at the second time, or when an overcurrent signal also occurs within the switch-on time duration of the power switch that is switched on at the second time, relative to start time of a switch-on time duration of a power switch, if time of occurrence of the overcurrent signal occurring at the second time is later than the time of occurrence of the overcurrent signal occurring at the first time, an active level that controls the power switch that is switched on at the second time to a switch-on state is also adjusted to an inactive level according to the time of occurrence of the overcurrent signal occurring at the first time, so that when an overcurrent signal occurs, it may be ensured that in the current period, the switch-on time duration of the power switch that is switched on at the first time is equal to the switch-on time duration of the power switch that is switched on at the second time, thereby implementing magnetic balance of a transformer. The active level is used to control a power switch to a switch-on state, and the inactive level is used to control the power switch to a switch-off state. For example, the active level may be at a high level, and the inactive level may be at a low level, which depends on a type of a transistor in the power switch and a specific circuit design of the power switch.

However, in the foregoing implementation process, if no overcurrent signal occurs within the switch-on time duration of the power switch that is switched on at the first time in the current period, but an overcurrent signal occurs within the switch-on time duration of the power switch that is switched on at the second time, to ensure that a bridge circuit is not damaged, only the active level that controls the power switch that is switched on at the second time to a switch-on state and is in the current period is disabled according to time of occurrence of the overcurrent signal, but a subsequent signal is not processed according to the current overcurrent signal, which finally causes duration of the disabled active level of the power switch that is switched on at the second time in the current period to be different from duration of the active level of the power switch that is switched on at the first time in the current period. In addition, the subsequent signal is not further processed subsequently; therefore, magnetic balance of the transformer cannot be ensured, thereby reducing reliability of the bridge circuit.

SUMMARY

Embodiments of the present invention provide a digital power supply protection circuit and an apparatus, which are used to ensure magnetic balance of a transformer in a bridge circuit, and improve reliability of the bridge circuit.

To achieve the foregoing objective, the following technical solutions are used in the embodiments of the present invention:

According to a first aspect, an embodiment of the present invention provides a digital power supply protection circuit, where the digital power supply protection circuit is applied to a bridge circuit, and the bridge circuit includes: a power switch that is switched on at a first time and a power switch that is switched on at a second time, the bridge circuit periodically works under control of an inceptive impulse clock timing, and each period is divided into the first half period and the second half period, where the power switch that is switched on at the first time is a power switch that is switched on in the first half period, the power switch that is switched on at the second time is a power switch that is switched on in the second half period, and the inceptive impulse clock timing includes a first inceptive impulse clock timing and a second inceptive impulse clock timing; and the digital power supply protection circuit includes: a signal preprocessing circuit, a signal generation circuit, and a clock timing adjustment circuit, where the signal preprocessing circuit is configured to receive an overcurrent signal and the first inceptive impulse clock timing, perform preprocessing on the overcurrent signal according to the first inceptive impulse clock timing so as to obtain a first reference signal, and send the first reference signal to the signal generation circuit, where the first inceptive impulse clock timing is an inceptive impulse clock timing that controls the power switch that is switched on at the first time in a current period, the overcurrent signal includes a signal that is output when an overcurrent occurs in the bridge circuit within time duration of an active level in the first inceptive impulse clock timing, and a rising edge of the first reference signal indicates a moment when the overcurrent occurs in the bridge circuit within the first inceptive impulse clock timing; the signal generation circuit is configured to receive the first inceptive impulse clock timing, count time duration between a rising edge of the first inceptive impulse clock timing and the rising edge of the first reference signal so as to obtain a first time duration, upon the first time duration is greater than a second time duration, generate a first disabling signal by delaying the rising edge of the first inceptive impulse clock timing for the second time duration, and send the first disabling signal to the clock timing adjustment circuit, where the second time duration is time duration between a switching-on moment of the power switch that is switched on at the second time in a previous period and a moment when the overcurrent occurs in the bridge circuit; and the clock timing adjustment circuit is configured to adjust the first inceptive impulse clock timing from the active level to an inactive level according to the first disabling signal, so that duration of the active level in an adjusted first inceptive impulse clock timing is equal to duration of an active level in a second inceptive impulse clock timing adjusted according to the second time duration, where the second inceptive impulse clock timing is an inceptive impulse clock timing that controls the power switch that is switched on at the second time in the previous period.

With reference to the first aspect, in a first possible implementation manner of the first aspect, the signal preprocessing circuit is further configured to receive the second inceptive impulse clock timing, perform preprocessing on the overcurrent signal according to the second inceptive impulse clock timing so as to obtain a second reference signal, and send the second reference signal to the signal generation circuit, where the overcurrent signal further includes a signal that is output when an overcurrent occurs in the bridge circuit within time duration of the active level in the second inceptive impulse clock timing, and a rising edge of the second reference signal indicates the moment when the overcurrent occurs in the bridge circuit within the second inceptive impulse clock timing; the signal generation circuit is further configured to receive the second inceptive impulse clock timing, count time duration between a rising edge of the second inceptive impulse clock timing and the rising edge of the second reference signal so as to obtain the second time duration, upon the second time duration is less than a stored third time duration, generate a second disabling signal by delaying the rising edge of the second inceptive impulse clock timing for the second time duration, send the second disabling signal to the clock timing adjustment circuit, and update the stored third time duration to the second time duration, where the third time duration is a switch-on time duration of the power switch that is switched on at the first time in the previous period; and the clock timing adjustment circuit is further configured to adjust the second inceptive impulse clock timing from the active level to an inactive level according to the second disabling signal.

With reference to the first aspect or the first possible implementation manner of the first aspect, in a second possible implementation manner of the first aspect, the signal generation circuit is further configured to: upon the first time duration is not greater than the second time duration, generate a third disabling signal by delaying the rising edge of the first inceptive impulse clock timing for the first time duration, and send the third disabling signal to the clock timing adjustment circuit; and the clock timing adjustment circuit is further configured to adjust the first inceptive impulse clock timing from the active level to the inactive level according to the third disabling signal.

With reference to the first or the second possible implementation manner of the first aspect, in a third possible implementation manner of the first aspect, the clock timing adjustment circuit is further configured to delay the first disabling signal according to a dead time during working of the bridge circuit so as to obtain a first delay signal, and adjust a third inceptive impulse clock timing to an active level according to the first delay signal; and delay the second disabling signal according to the dead time during working of the bridge circuit so as to obtain a second delay signal, and adjust a fourth inceptive impulse clock timing to an active level according to the second delay signal, where the third inceptive impulse clock timing is an inceptive impulse clock timing that controls a first synchronous rectifier corresponding to the power switch that is switched on at the first time in the bridge circuit, and the fourth inceptive impulse clock timing is an inceptive impulse clock timing that controls a second synchronous rectifier corresponding to the power switch that is switched on at the second time in the bridge circuit.

With reference to the first aspect or any one of the first to the third possible implementation manners of the first aspect, in a fourth possible implementation manner of the first aspect, the signal preprocessing circuit includes a first-base-signal generation circuit and a first logic circuit, where the first-base-signal generation circuit is configured to receive the first inceptive impulse clock timing, generate a first base signal according to the first inceptive impulse clock timing, and send the first base signal to the first logic circuit; and the first logic circuit is configured to receive the overcurrent signal, perform an AND operation on the first base signal and the overcurrent signal to obtain a rising edge so as to obtain the first reference signal, and send the first reference signal to the signal generation circuit.

With reference to any one of the first to the third possible implementation manners of the first aspect, in a fifth possible implementation manner of the first aspect, the signal preprocessing circuit further includes a second-base-signal generation circuit and a second logic circuit, where the second-base-signal generation circuit is configured to receive the second inceptive impulse clock timing, generate a second base signal according to the second inceptive impulse clock timing, and send the second base signal to the second logic circuit; and the second logic circuit is configured to receive the overcurrent signal, perform an AND operation on the second base signal and the overcurrent signal to obtain a rising edge so as to obtain the second reference signal, and send the second reference signal to the signal generation circuit.

With reference to the first aspect or any one of the first to the fifth possible implementation manners of the first aspect, in a sixth possible implementation manner of the first aspect, the signal generation circuit includes a counter, a latch, and a controller, where the counter is configured to receive the first reference signal, count the time duration between the rising edge of the first inceptive impulse clock timing and the rising edge of the first reference signal so as to obtain the first time duration, and send the first time duration to the controller; the latch is configured to store the second time duration, and send the second time duration to the controller; and the controller is configured to: upon the first time duration is greater than the second time duration, generate the first disabling signal by delaying the rising edge of the first inceptive impulse clock timing for the second time duration, and send the disabling signal to the clock timing adjustment circuit.

With reference to any one of the first to the third possible implementation manners of the first aspect or the fifth possible implementation manner of the first aspect, in a seventh possible implementation manner of the first aspect, the signal generation circuit includes a counter, a latch, and a controller, where the counter is configured to receive the second reference signal, count the time duration between the rising edge of the second inceptive impulse clock timing and the rising edge of the second reference signal so as to obtain the second time duration, and send the second time duration to the controller; the latch is configured to store the third time duration, and send the third time duration to the controller; and the controller is configured to: upon the second time duration is less than the third time duration, generate the second disabling signal by delaying the rising edge of the second inceptive impulse clock timing for the second time duration, send the second disabling signal to the clock timing adjustment circuit, and trigger the latch to update the stored third time duration to the second time duration.

According to a second aspect, an embodiment of the present invention provides a digital power supply, where the digital power supply includes a bridge circuit and the foregoing digital power supply protection circuit, where the digital power supply protection circuit is configured to adjust at least one of a first inceptive impulse clock timing or a second inceptive impulse clock timing according to an overcurrent signal, and send at least one of an adjusted first inceptive impulse clock timing or an adjusted second inceptive impulse clock timing to the bridge circuit; and the bridge circuit is configured to control, according to the at least one of the adjusted first inceptive impulse clock timing or the adjusted second inceptive impulse clock timing, at least one of a power switch that is switched on at the first time or a power switch that is switched on at the second time in the bridge circuit.

With reference to the second aspect, in a first possible implementation manner of the second aspect, the digital power supply further includes an output current collection circuit, where the output current collection circuit is configured to collect an output current of the bridge circuit, determine the overcurrent signal according to the output current of the bridge circuit, and send the overcurrent signal to the digital power supply protection circuit.

The embodiments of the present invention provide a digital power supply protection circuit and an apparatus, and the digital power supply protection circuit is applied to a bridge circuit, so that a switch-on time duration of a power switch that is switched on at the second time in a previous period is equal to a switch-on time duration of a power switch that is switched on at the first time in a current period, thereby ensuring magnetic balance of a transformer, and improving reliability of the bridge circuit.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

It should be noted that, an active level in all embodiments of the present invention refers to a level at which a related component controlled by the signal properly works, and an inactive level refers to a level at which the related component controlled by the signal does not work. According to different specific circuit implementations, an active signal may be a high level signal, and an inactive signal may be a low level signal; or an active signal may be a low level signal, and an inactive signal is a high level signal.

Figure 3:
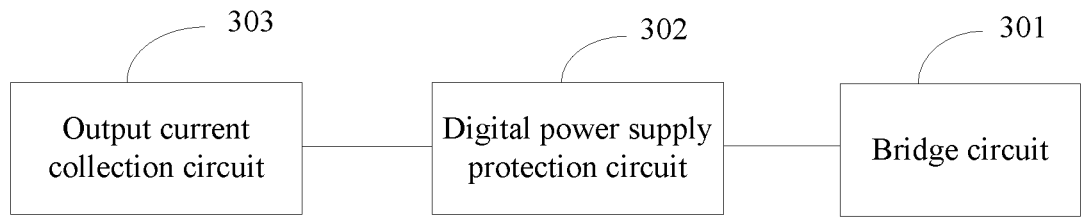
FIG. 3 is a schematic structural diagram of a digital power supply according to an embodiment of the present invention.

An embodiment of the present invention provides a digital power supply, and as shown in FIG. 3, the digital power supply includes a bridge circuit 301 and a digital power supply protection circuit 302.

Figure 1:
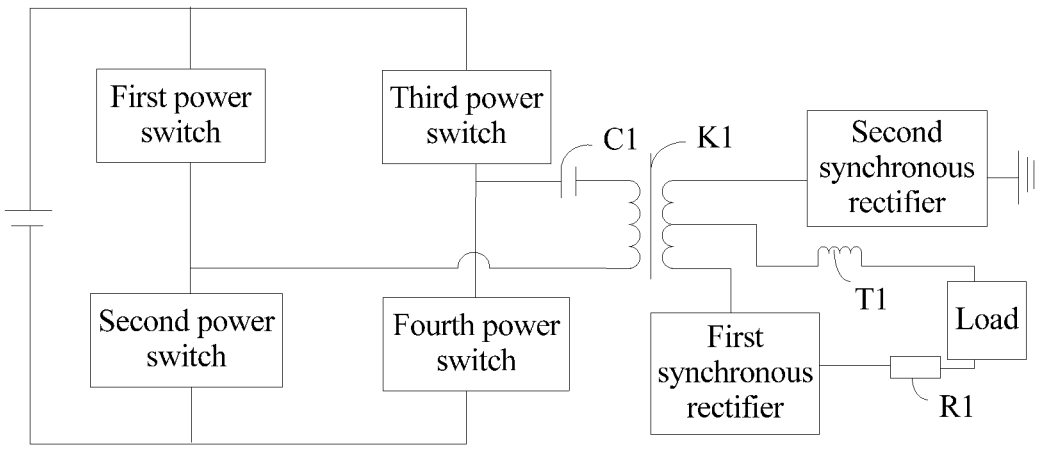
FIG. 1 is an exemplary diagram of a full bridge circuit according to the prior art.
Figure 2:
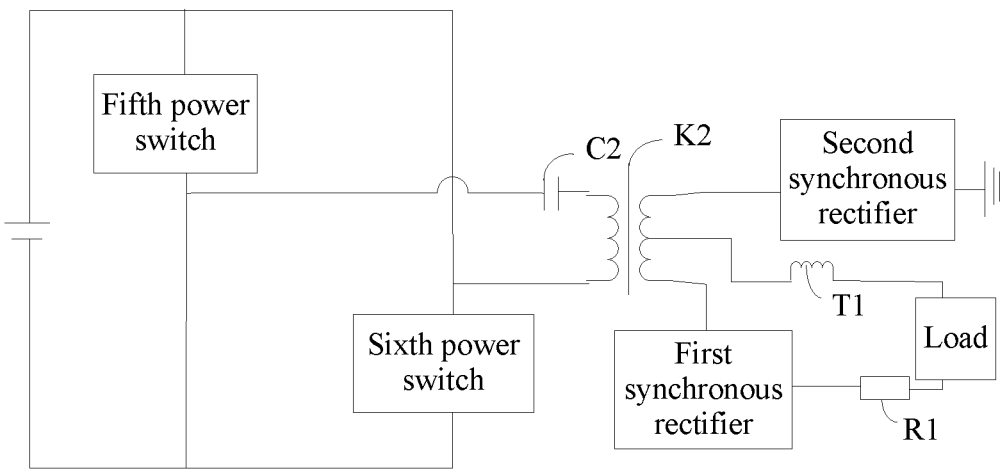
FIG. 2 is an exemplary diagram of a half bridge circuit according to the prior art.

The bridge circuit 301 mentioned in this embodiment of the present invention may be either a full bridge circuit or a half bridge circuit in the prior art, as shown in FIG. 1 or FIG. 2.

The bridge circuit 301 periodically works under control of an inceptive impulse clock timing, and each period is divided into the first half period and the second half period, where a power switch that is switched on at a first time is a power switch that is switched on in the first half period, a power switch that is switched on at a second time is a power switch that is switched on in the second half period, and the inceptive impulse clock timing includes a first inceptive impulse clock timing and a second inceptive impulse clock timing.

An output end of the digital power supply protection circuit 302 is connected to the bridge circuit 301.

The digital power supply protection circuit 302 is configured to adjust at least one of the first inceptive impulse clock timing or the second inceptive impulse clock timing according to an overcurrent signal, and send at least one of an adjusted first inceptive impulse clock timing or an adjusted second inceptive impulse clock timing to the bridge circuit 301.

Upon an overcurrent signal occurs relatively late or no overcurrent signal occurs when the power switch that is switched on at the first time is switched on in a current period, the first inceptive impulse clock timing that controls the power switch that is switched on at the first time in the current period is adjusted from the active level to an inactive level according to a switch-on time duration of the power switch that is switched on at the second time in a previous period, so that the switch-on time duration of the power switch that is switched on at the second time in the previous period is equal to a switch-on time duration of the power switch that is switched on at the first time in the current period.

If time of occurrence of an overcurrent within the switch-on time duration of the power switch that is switched on at the second time in the previous period is earlier than time of occurrence of an overcurrent signal occurring within a switch-on time duration of the power switch that is switched on at the first time in the previous period, to ensure that an overcurrent signal occurring within the switch-on time duration of the power switch that is switched on at the second time in the previous period does not damage the bridge circuit, the second inceptive impulse clock timing that controls the power switch that is switched on at the second time in the previous period is adjusted from the active level to an inactive level according to a second time duration, so as to ensure safety of the bridge circuit.

The bridge circuit 301 is configured to control, according to the at least one of the adjusted first inceptive impulse clock timing or the adjusted second inceptive impulse clock timing, at least one of the power switch that is switched on at the first time or the power switch that is switched on at the second time in the bridge circuit 301.

Specifically, the bridge circuit 301 controls, according to the adjusted first inceptive impulse clock timing, the switch-on time duration of the power switch that is switched on at the first time in the current period, where duration of the active level in the first inceptive impulse clock timing is the switch-on time duration of the power switch that is switched on at the first time in the current period.

The bridge circuit 301 controls, according to the adjusted second inceptive impulse clock timing, the switch-on time duration of the power switch that is switched on at the second time in the previous period, where duration of the active level in the second inceptive impulse clock timing is the switch-on time duration of the power switch that is switched on at the second time in the previous period.

Further, as shown in FIG. 3, the digital power supply further includes an output current collection circuit 303.

An input end of the digital power supply protection circuit 302 is connected to the output current collection circuit 303.

The output current collection circuit 303 is configured to collect an output current of the bridge circuit 301, and generate an overcurrent signal according to the output current of the bridge circuit 301.

Specifically, the output current collection circuit 303 is configured to collect an output current of the full bridge circuit shown in FIG. 1 or an output current of the half bridge circuit shown in FIG. 2. There is a reference current in the output current collection circuit 303, and is used for determining whether an overcurrent is generated in a signal that is output by the bridge circuit. When determining that the output current of the bridge circuit is larger than the reference current received by a second input end, the output current collection circuit 303 determines that an output end of the bridge circuit generates an overcurrent signal, and uses the collected output current of the bridge circuit as the overcurrent signal to send to the digital power supply protection circuit 302. For a specific implementation structure of the output current collection circuit 303, reference may be made to descriptions of the prior art.

It should be noted that, a manner in which the output current collection circuit 303 collects the output current of the bridge circuit may be: connecting the output end of the bridge circuit 301 to a resistor whose resistance value is extremely small, collecting a voltage at two ends of the resistor, and obtaining the output current of the bridge circuit by combining a value of the voltage and the resistance value of the resistor. Certainly, the output current of the bridge circuit may also be collected according to any one of methods for collecting a current of a circuit in the prior art, and the present invention sets no limitation thereto.

Figure 4:
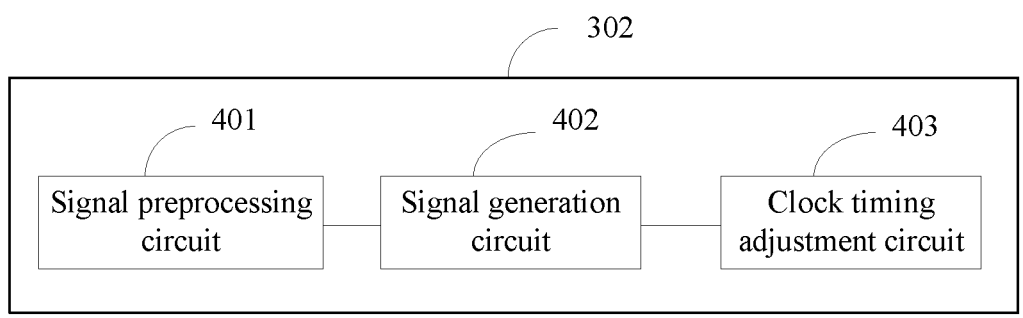
FIG. 4 is a schematic diagram of a digital power supply protection circuit according to an embodiment of the present invention.

Further, as shown in FIG. 4, the digital power supply protection circuit 302 includes a signal preprocessing circuit 401, a signal generation circuit 402, and a clock timing adjustment circuit 403.

An input end of the signal generation circuit 402 is connected to an output end of the signal preprocessing circuit 401, and an output end of the signal generation circuit 402 is connected to an input end of the clock timing adjustment circuit 403.

The signal preprocessing circuit 401 is configured to receive an overcurrent signal and the first inceptive impulse clock timing, perform preprocessing on the overcurrent signal according to the first inceptive impulse clock timing so as to obtain a first reference signal, and send the first reference signal to the signal generation circuit, where the first inceptive impulse clock timing is an inceptive impulse clock timing that controls the power switch that is switched on at the first time in the current period, the overcurrent signal includes a signal that is output when an overcurrent occurs in the bridge circuit within time duration of an active level in the first inceptive impulse clock timing, and a rising edge of the first reference signal indicates a moment when the overcurrent occurs in the bridge circuit within the first inceptive impulse clock timing.

The signal generation circuit 402 is configured to receive the first inceptive impulse clock timing, count time duration between a rising edge of the first inceptive impulse clock timing and the rising edge of the first reference signal so as to obtain a first time duration, upon the first time duration is greater than a second time duration, generate a first disabling signal by delaying the rising edge of the first inceptive impulse clock timing for the second time duration, and send the first disabling signal to the clock timing adjustment circuit, where the second time duration is time duration between a switching-on moment of the power switch that is switched on at the second time in the previous period and a moment when the overcurrent occurs in the bridge circuit.

The clock timing adjustment circuit 403 is configured to adjust the first inceptive impulse clock timing from the active level to the inactive level according to the first disabling signal, so that duration of the active level in an adjusted first inceptive impulse clock timing is equal to duration of an active level in a second inceptive impulse clock timing adjusted according to the second time duration, where the second inceptive impulse clock timing is an inceptive impulse clock timing that controls the power switch that is switched on at the second time in the previous period.

It should be noted that, because the power switch that is switched on at the first time and the power switch that is switched on at the second time in the bridge circuit need to be periodically switched on in turn, the active level in the inceptive impulse clock timing that controls the power switch that is switched on at the first time and the active level in the inceptive impulse clock timing that controls the power switch that is switched on at the second time alternately occur. A period is obtained by using time of occurrence of a rising edge of the inceptive impulse clock timing that controls the power switch that is switched on at the first time as start time of the period, and by using time of occurrence of a next rising edge of the inceptive impulse clock timing that controls the power switch that is switched on at the first time as end time of the period. The previous period is a period previous to the current period. The previous period may be the first period in which the bridge circuit controls switch-on and switch-off of a power switch, or may be an intermediate period in which the bridge circuit controls switch-on and switch-off of a power switch, and the present invention sets no limitation thereto.

Specifically, the overcurrent signal received by an input end of the signal preprocessing circuit 401 is a signal that is output by the bridge circuit when the overcurrent occurs within the time duration of the active level in the first inceptive impulse clock timing. Because oscillation is generated instantaneously when a power switch in the bridge circuit is switched on or switched off, a glitch exists in the overcurrent signal. To filter out the glitch, the signal preprocessing circuit 401 delays, according to a width of the glitch, a rising edge of the inceptive impulse clock timing that controls the power switch that is switched on at the first time in the current period, that is, the rising edge of the first inceptive impulse clock timing, and performs logical operation on an inceptive impulse clock timing whose rising edge is delayed and the overcurrent signal, so as to obtain an overcurrent signal in which the glitch is filtered out, that is, the first reference signal, where the rising edge of the first reference signal represents the moment when the overcurrent occurs within the switch-on time duration of the power switch that is switched on at the first time in the current period. In addition, the signal generation circuit 402 receives the first reference signal from the signal preprocessing circuit 401, starts timing from the rising edge of the first inceptive impulse clock timing and stops timing until the rising edge of the first reference signal occurs, so as to obtain time duration between a switching-on moment of the power switch that is switched on at the first time and the moment when the overcurrent occurs, that is, the first time duration, and compares the first time duration with the stored second time duration between the switching-on moment of the power switch that is switched on at the second time in the previous period and the moment when the overcurrent signal occurs. If it is determined that the first time duration is greater than the second time duration, it indicates that time of occurrence of the overcurrent within the switch-on time duration of the power switch that is switched on at the first time in the current period is later than the time of occurrence of the overcurrent within the switch-on time duration of the power switch that is switched on at the second time in the previous period. To ensure that the switch-on time duration of the power switch that is switched on at the first time in the current period is equal to the switch-on time duration of the power switch that is switched on at the second time in the previous period, the switch-on time duration of the power switch that is switched on at the first time in the current period needs to be controlled according to the second time duration. In this case, the signal generation circuit 402 generates the first disabling signal by delaying the rising edge of the first inceptive impulse clock timing for the second time duration. The clock timing adjustment circuit 403 receives the first disabling signal from the signal generation circuit 402, and adjusts the first inceptive impulse clock timing from the active level to the inactive level according to the first disabling signal, so as to control the duration of the active level in the first inceptive impulse clock timing. The second time duration is duration of the active level in the second inceptive impulse clock timing that controls the power switch that is switched on at the second time in the previous period, that is, the switch-on time duration of the power switch that is switched on at the second time in the previous period, and in this case, the duration of the active level in the first inceptive impulse clock timing is controlled according to the first disabling signal generated from the second time duration, that is, the switch-on time duration of the power switch that is switched on at the first time in this period is controlled according to the second time duration, therefore, the switch-on time duration of the power switch that is switched on at the second time in the previous period is equal to the switch-on time duration of the power switch that is switched on at the first time in the current period, thereby ensuring magnetic balance of a transformer.

It should be noted that, the width of the glitch is related to a feature of a power switch in the bridge circuit, and is generally a reference value obtained according to a test result.

It should be noted that, a method for obtaining the first reference signal by the signal preprocessing circuit 401 may be the foregoing method, or may be another manner in the prior art, which is not limited in the present invention, provided that the rising edge of the first reference signal indicates the moment when the overcurrent occurs in the bridge circuit within the first inceptive impulse clock timing.

It should be noted that, although the overcurrent signal is a signal that is output when the overcurrent occurs in the bridge circuit within the time duration of the active level in the first inceptive impulse clock timing, upon overcurrent determining is not specifically performed on the signal that is output by the bridge circuit, it is not known whether an overcurrent occurs in the bridge circuit. Therefore, a circuit for overcurrent determining may be added behind the bridge circuit, such as the output current collection circuit 303 in FIG. 3, which is configured to determine whether an overcurrent occurs in the bridge circuit.

This embodiment of the present invention provides a digital power supply protection circuit 302 that is applied to a bridge circuit and includes a signal preprocessing circuit, a signal generation circuit, and a clock timing adjustment circuit. When receiving an overcurrent signal, the signal preprocessing circuit performs preprocessing on the overcurrent signal according to a first inceptive impulse clock timing so as to obtain a first reference signal. The signal generation circuit counts time duration between a rising edge of the first inceptive impulse clock timing and a rising edge of the first reference signal so as to obtain a first time duration, and upon the first time duration is greater than a second time duration between a switching-on moment of a power switch that is switched on at the second time in a previous period and a moment when an overcurrent occurs, generates a first disabling signal by delaying the rising edge of the first inceptive impulse clock timing for the second time duration. The clock timing adjustment circuit adjusts the first inceptive impulse clock timing from the active level to an inactive level according to the first disabling signal. In this way, when an overcurrent occurs within a switch-on time duration of the power switch that is switched on at the second time in the previous period, to avoid the overcurrent from damaging the bridge circuit, an inceptive impulse clock timing that controls the power switch that is switched on at the second time in the previous period, that is, a second inceptive impulse clock timing, needs to be adjusted from the active level to an inactive level according to the second time duration. In addition, upon the overcurrent signal occurs relatively late or no overcurrent signal occurs when a power switch that is switched on at the first time is switched on in a current period, an inceptive impulse clock timing that controls the power switch that is switched on at the first time in the current period, that is, the first inceptive impulse clock timing, is adjusted from the active level to the inactive level according to the second time duration, so that the switch-on time duration of the power switch that is switched on at the second time in the previous period is equal to a switch-on time duration of the power switch that is switched on at the first time in the current period, thereby ensuring magnetic balance of a transformer, and improving reliability of the bridge circuit.

Further, the signal preprocessing circuit 401 is further configured to receive the second inceptive impulse clock timing, perform preprocessing on the overcurrent signal according to the second inceptive impulse clock timing so as to obtain a second reference signal, and send the second reference signal to the signal generation circuit 402, where the overcurrent signal further includes a signal that is output when an overcurrent occurs in the bridge circuit within time duration of an active level in the second inceptive impulse clock timing, and a rising edge of the second reference signal indicates the moment when the overcurrent occurs in the bridge circuit within the second inceptive impulse clock timing.

The signal generation circuit 402 is further configured to receive the second inceptive impulse clock timing, count time duration between a rising edge of the second inceptive impulse clock timing and the rising edge of the second reference signal so as to obtain the second time duration, upon the second time duration is less than a stored third time duration, generate a second disabling signal by delaying the rising edge of the second inceptive impulse clock timing for the second time duration, send the second disabling signal to the clock timing adjustment circuit 403, and update the stored third time duration to the second time duration, where the third time duration is a switch-on time duration of the power switch that is switched on at the first time in the previous period, and it should be noted that, an overcurrent may occur or may not occur in a switching-on process of the power switch that is switched on at the first time in the previous period.

The clock timing adjustment circuit 403 is further configured to adjust the second inceptive impulse clock timing from the active level to the inactive level according to the second disabling signal.

Specifically, when receiving the overcurrent signal, the signal preprocessing circuit 401 delays, according to the width of the glitch, a rising edge of the inceptive impulse clock timing that controls the power switch that is switched on at the second time in the previous period, that is, the rising edge of the second inceptive impulse clock timing; and after an AND operation is performed on the inceptive impulse clock timing whose rising edge is delayed and the overcurrent signal to obtain a rising edge, obtains an overcurrent signal in which the glitch is filtered out and that occurs within the time duration of the active level in the second inceptive impulse clock timing, where the rising edge of the second inceptive impulse clock timing represents the moment when the overcurrent occurs within the switch-on time duration of the power switch that is switched on at the second time in the previous period. In addition, the signal generation circuit 402 receives the second reference signal from the signal preprocessing circuit 401, starts timing from the rising edge of the second inceptive impulse clock timing and stops timing until the rising edge of the second reference signal occurs, so as to obtain time duration between the switching-on moment of the power switch that is switched on at the second time and the moment when the overcurrent occurs, that is, the second time duration, and compares the obtained second time duration with the stored switch-on time duration of the power switch that is switched on at the first time in the previous period, that is, the third time duration. If it is determined that the second time duration is less than the third time duration, it indicates that the time of occurrence of the overcurrent within the switch-on time duration of the power switch that is switched on at the second time in the previous period is earlier than the time of occurrence of the overcurrent signal within the switch-on time duration of the power switch that is switched on at the first time in the previous period. In this case, because an inceptive impulse clock timing that controls the power switch that is switched on at the first time in the previous period has been generated, the inceptive impulse clock timing cannot be modified. To ensure that the overcurrent signal occurring within the switch-on time duration of the power switch that is switched on at the second time in the previous period does not damage the bridge circuit, the rising edge of the second inceptive impulse clock timing is delayed for the second time duration to generate the second disabling signal. In this case, the clock timing adjustment circuit 403 receives the second disabling signal from the signal generation circuit 402, and adjusts the second inceptive impulse clock timing from the active level to the inactive level according to the second disabling signal, thereby ensuring safety of the bridge circuit.

Further, the signal generation circuit 402 is further configured to: upon the first time duration is not greater than the second time duration, generate a third disabling signal by delaying the rising edge of the first inceptive impulse clock timing for the first time duration, and send the third disabling signal to the clock timing adjustment circuit 403.

The clock timing adjustment circuit 403 is further configured to adjust the first inceptive impulse clock timing from the active level to the inactive level according to the third disabling signal, so that the overcurrent signal does not damage the bridge circuit.

Specifically, when the first time duration is not greater than the second time duration, it indicates that the time of occurrence of the overcurrent within the switch-on time duration of the power switch that is switched on at the first time in the current period is earlier than or is the same as the time of occurrence of the overcurrent within the switch-on time duration of the power switch that is switched on at the second time in the previous period. In this case, because the inceptive impulse clock timing that controls the power switch that is switched on at the second time in the previous period has been generated, the inceptive impulse clock timing cannot be modified. To ensure that the overcurrent signal occurring within the switch-on time duration of the power switch that is switched on at the first time in the current period does not damage the bridge circuit, the signal generation circuit 402 generates the third disabling signal by delaying the rising edge of the first inceptive impulse clock timing for the first time duration, and sends the third disabling signal to the clock timing adjustment circuit 403. In this case, the clock timing adjustment circuit 403 receives the third disabling signal from the signal generation circuit 402, and adjusts the first inceptive impulse clock timing from the active level to the inactive level according to the third disabling signal, thereby ensuring safety of the bridge circuit.

Further, the clock timing adjustment circuit 403 is further configured to delay the first disabling signal according to a dead time during working of the bridge circuit so as to obtain a first delay signal, and adjust a third inceptive impulse clock timing to an active level according to the first delay signal; and delay the second disabling signal according to the dead time during working of the bridge circuit so as to obtain a second delay signal, and adjust a fourth inceptive impulse clock timing to an active level according to the second delay signal, where the third inceptive impulse clock timing is an inceptive impulse clock timing that controls a first synchronous rectifier corresponding to the power switch that is switched on at the first time in the bridge circuit, and the fourth inceptive impulse clock timing is an inceptive impulse clock timing that controls a second synchronous rectifier corresponding to the power switch that is switched on at the second time in the bridge circuit.

It should be noted that, a status of the first synchronous rectifier varies with a status of the power switch that is switched on at the first time. When the power switch that is switched on at the first time is switched on, the first synchronous rectifier does not work; when the power switch that is switched on at the first time is switched off, the first synchronous rectifier works. Correspondingly, when the inceptive impulse clock timing that controls the power switch that is switched on at the first time is at the active level, the third inceptive impulse clock timing that controls the first synchronous rectifier is at the inactive level; when the inceptive impulse clock timing that controls the power switch that is switched on at the first time is at the inactive level, the third inceptive impulse clock timing that controls the first synchronous rectifier is at the active level.

It should be noted that, referring to FIG. 1 or FIG. 2, a status of the second synchronous rectifier varies with a status of the power switch that is switched on at the second time. When the power switch that is switched on at the second time is switched on, the second synchronous rectifier does not work; when the power switch that is switched on at the second time is switched off, the second synchronous rectifier works. Correspondingly, when the inceptive impulse clock timing that controls the power switch that is switched on at the second time is at the active level, the fourth inceptive impulse clock timing that controls the second synchronous rectifier is at the inactive level; when the inceptive impulse clock timing that controls the power switch that is switched on at the second time is at the inactive level, the fourth inceptive impulse clock timing that controls the second synchronous rectifier is at the active level.

Specifically, after receiving the first disabling signal and the second disabling signal, the clock timing adjustment circuit 403 separately delays the first disabling signal and the second disabling signal according to the dead time during working of the bridge circuit, so as to obtain the corresponding first delay signal and second delay signal; adjusts, according to the first delay signal, the inceptive impulse clock timing that controls the first synchronous rectifier in the bridge circuit, that is, the third inceptive impulse clock timing, to the active level, that is, resets the third inceptive impulse clock timing; and adjusts, according to the second delay signal, the inceptive impulse clock timing that controls the second synchronous rectifier in the bridge circuit, that is, the fourth inceptive impulse clock timing, to the active level, that is, resets the fourth inceptive impulse clock timing, so as to prevent the power switch that is switched on at the first time and the power switch that is switched on at the second time from being simultaneously switched on or switched off in the bridge circuit within one period.

Figure 5:
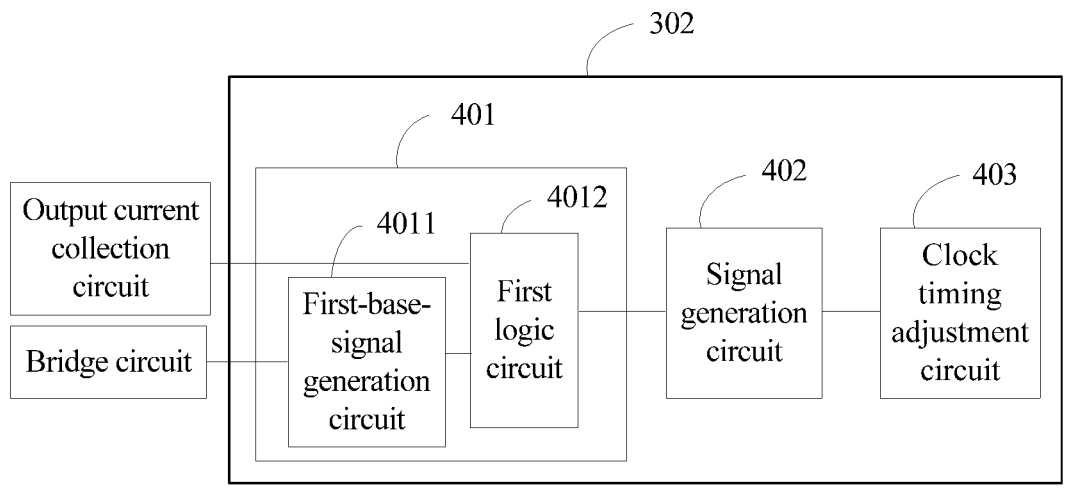
FIG. 5 is a schematic diagram of another digital power supply protection circuit according to an embodiment of the present invention.

Preferably, as shown in FIG. 5, the signal preprocessing circuit 401 includes a first-base-signal generation circuit 4011 and a first logic circuit 4012.

An input end of the first logic circuit 4012 is connected to an output end of the first-base-signal generation circuit 4011, and an output end of the first logic circuit 4012 is connected to a first input end of the signal generation circuit.

The first-base-signal generation circuit 4011 is configured to receive the first inceptive impulse clock timing, generate a first base signal according to the first inceptive impulse clock timing, and send the first base signal to the first logic circuit 4012.

The first logic circuit 4012 is configured to receive the overcurrent signal, perform an AND operation on the first base signal and the overcurrent signal to obtain a rising edge so as to obtain the first reference signal, and send the first reference signal to the signal generation circuit.

Specifically, an input end of the first-base-signal generation circuit 4011 is connected to the output end of the bridge circuit, and is configured to acquire the inceptive impulse clock timing that controls the power switch that is switched on at the first time in the current period, that is, the first inceptive impulse clock timing, delay the rising edge of the first inceptive impulse clock timing according to the width of the glitch generated in the overcurrent signal, so as to obtain a rising edge of the first base signal, and control duration of the first base signal to be less than a half period, so as to obtain a falling edge of the first base signal. Because a first input end of the first logic circuit 4012 is connected to the output end of the first-base-signal generation circuit 4011 and is configured to receive the first base signal, and a second input end of the first logic circuit 4012 is connected to an output end of the output current collection circuit 303 and is configured to receive the overcurrent signal, in this case, the first logic circuit 4012 performs the AND operation on the overcurrent signal and the first base signal to obtain the rising edge so as to obtain the first reference signal. Also, because the output end of the first logic circuit 4012 is connected to the first input end of the signal generation circuit 402, the first reference signal can be output to the signal generation circuit 402.

Figure 6:
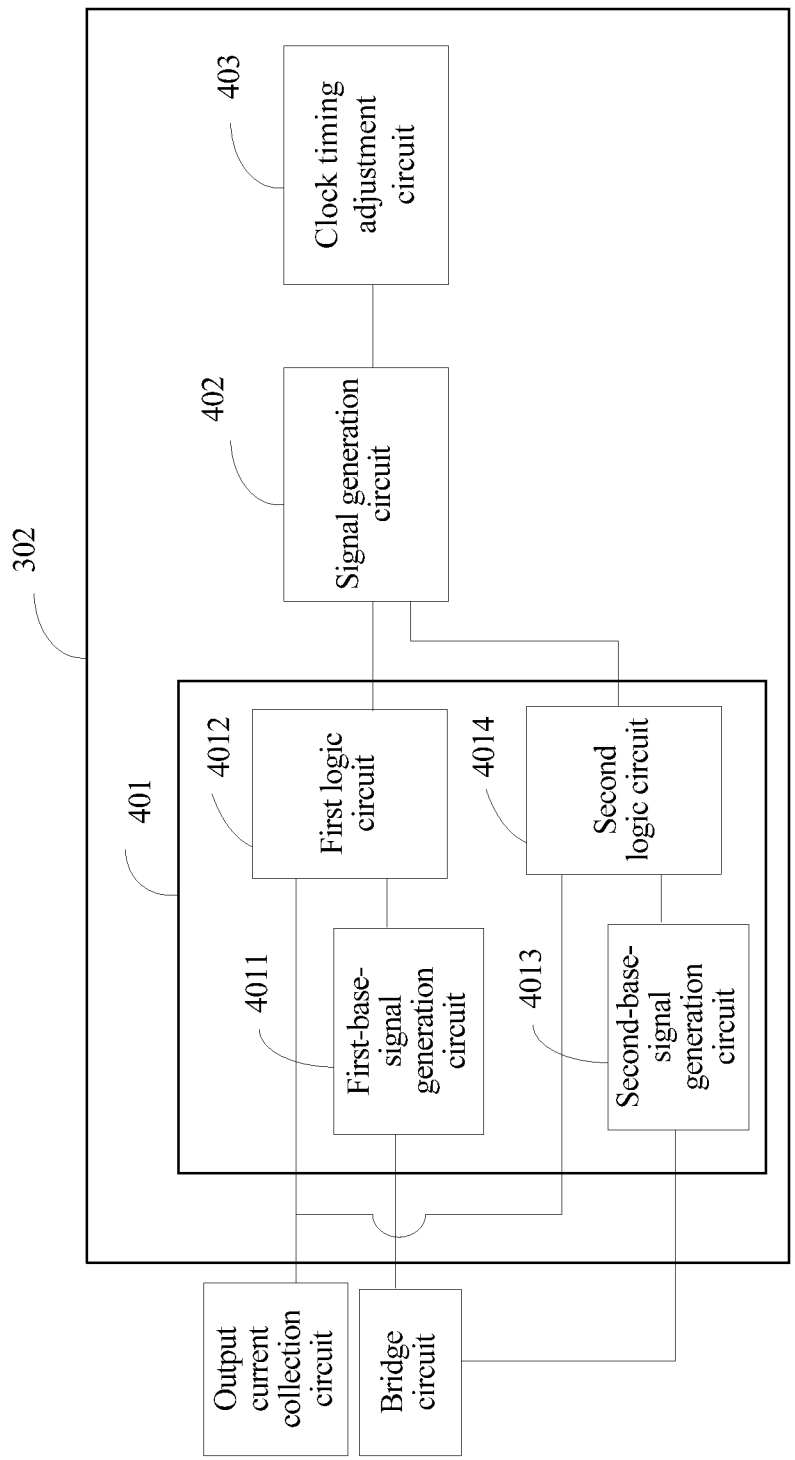
FIG. 6 is a schematic diagram of another digital power supply protection circuit according to an embodiment of the present invention.

As shown in FIG. 6, the signal preprocessing circuit 401 further includes a second-base-signal generation circuit 4013 and a second logic circuit 4014.

An input end of the second logic circuit 4014 is connected to an output end of the second-base-signal generation circuit 4013, and an output end of the second logic circuit 4014 is connected to a second input end of the signal generation circuit 402.

The second-base-signal generation circuit 4013 is configured to receive the second inceptive impulse clock timing, generate a second base signal according to the second inceptive impulse clock timing, and send the second base signal to the second logic circuit 4014.

The second logic circuit 4014 is configured to receive the overcurrent signal, perform an AND operation on the second base signal and the overcurrent signal to obtain a rising edge so as to obtain the second reference signal, and send the second reference signal to the signal generation circuit.

Specifically, an input end of the second-base-signal generation circuit 4013 is connected to the output end of the bridge circuit, and is configured to acquire the inceptive impulse clock timing that controls the power switch that is switched on at the second time in the previous period, that is, the second inceptive impulse clock timing, delay the rising edge of the second inceptive impulse clock timing according to the width of the glitch generated in the overcurrent signal, so as to obtain a rising edge of the second base signal, and control duration of the second base signal to be less than a half period, so as to obtain a falling edge of the second base signal. Because a first input end of the second logic circuit 4014 is connected to the output end of the second-base-signal generation circuit 4013 and is configured to receive the second base signal, and a second input end of the second logic circuit 4014 is connected to an output end of the output current collection circuit 303 and is configured to receive the overcurrent signal, in this case, the second logic circuit 4014 performs the AND operation on the overcurrent signal and the second base signal to obtain the rising edge so as to obtain the second reference signal. Also, because the output end of the second logic circuit 4014 is connected to the second input end of the signal generation circuit 402, the second reference signal can be output to the signal generation circuit 402.

Figure 7:
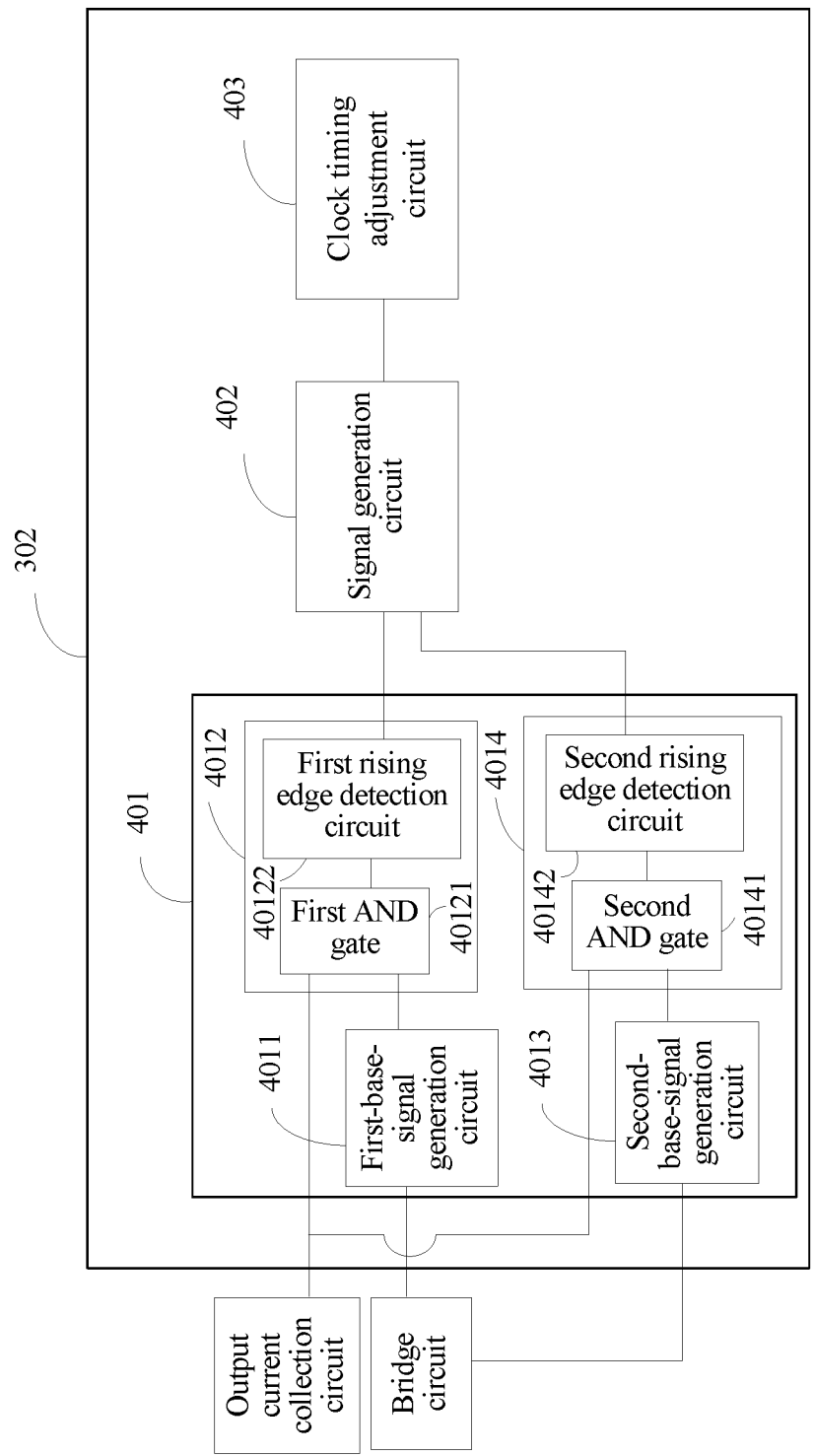
FIG. 7 is a schematic diagram of another digital power supply protection circuit according to an embodiment of the present invention.

Preferably, as shown in FIG. 7, the first logic circuit 4012 includes a first AND gate 40121 and a first rising edge detection circuit 40122, and the second logic circuit 4014 includes a second AND gate 40141 and a second rising edge detection circuit 40142.

A first input end of the first AND gate 40121 is connected to the output end of the first-base-signal generation circuit 4011, a second input end of the first AND gate 40121 is connected to an output end of a signal collection circuit, an output end of the first AND gate 40121 is connected to an input end of the first rising edge detection circuit 40122, and an output end of the first rising edge detection circuit 40122 is connected to the first input end of the signal generation circuit 402. A first input end of the second AND gate 40141 is connected to the output end of the second-base-signal generation circuit 4014, a second input end of the second AND gate 40141 is connected to the output end of the signal collection circuit, an output end of the second AND gate 40141 is connected to an input end of the second rising edge detection circuit 40142, and an output end of the second rising edge detection circuit 40142 is connected to the second input end of the signal generation circuit 402.

The first AND gate 40121 is configured to perform the AND operation on the first base signal and the overcurrent signal, and output a result of the AND operation to the first rising edge detection circuit 40122, so that the first rising edge detection circuit 40122 obtains the rising edge from the result of the AND operation performed on the first base signal and the overcurrent signal, and generates a timing pulse to obtain the first reference signal. The second AND gate 40141 is configured to perform the AND operation on the second base signal and the overcurrent signal, and output a result of the AND operation to the second rising edge detection circuit 40142, so that the second rising edge detection circuit 40142 obtains the rising edge from the result of the AND operation performed on the second base signal and the overcurrent signal, and generates a timing pulse to obtain the second reference signal.

Figure 8:
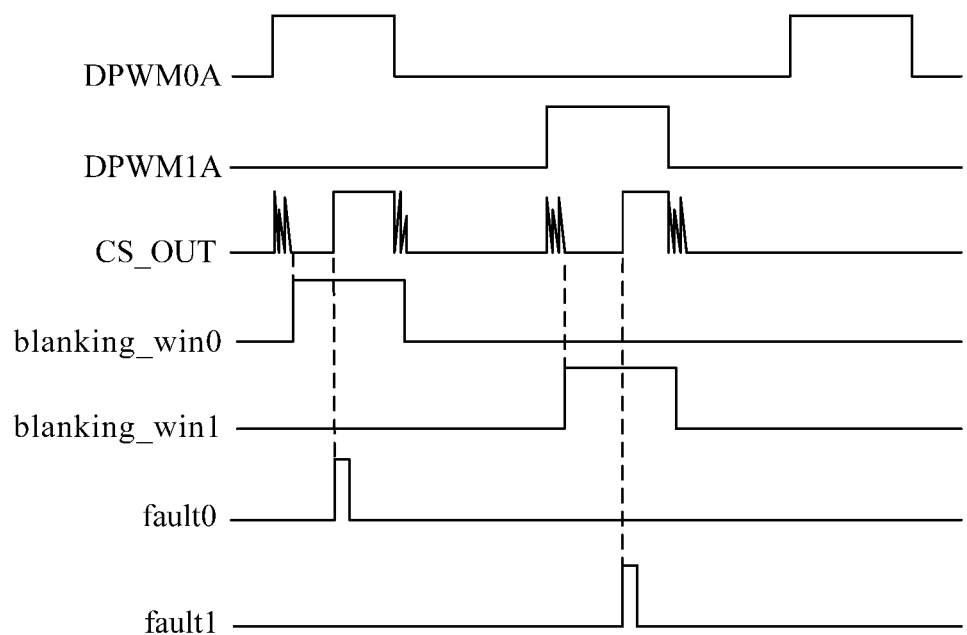
FIG. 8 is an example diagram of an inceptive impulse clock timing according to an embodiment of the present invention.

Exemplarily, as shown in FIG. 8, it is assumed that a waveform of the overcurrent signal received by the signal preprocessing circuit 401 is CS_OUT, the received first inceptive impulse clock timing is DPWM0A, and the received second inceptive impulse clock timing is DPWM1A. The signal preprocessing circuit 401 delays the rising edge of the first inceptive impulse clock timing DPWM0A, so as to obtain the rising edge of the first base signal blanking_win0, and controls the duration of the first base signal blanking_win0 to be less than a half period, so as to obtain the falling edge of the first base signal blanking_win0. The rising edge of the first inceptive impulse clock timing DPWM0A is delayed so as to filter out the glitch in the overcurrent signal CS_OUT, and a specific delay time duration may be set by a person skilled in the art according to experience. The signal preprocessing circuit 401 delays the rising edge of the second inceptive impulse clock timing DPWM1A, so as to obtain the rising edge of the second base signal blanking_win1, and controls the duration of the second base signal blanking_win1 to be less than a half period, so as to obtain the falling edge of the second base signal blanking_win1. The rising edge of the second inceptive impulse clock timing DPWM1A is delayed so as to filter out the glitch in the overcurrent signal CS_OUT, and a specific delay time duration may be set by a person skilled in the art according to experience. Then, the AND operation is performed on the first base signal blanking_win0 and the overcurrent signal CS_OUT to obtain the rising edge, so as to obtain the first reference signal fault0; and the AND operation is performed on the second base signal blanking_win1 and the overcurrent signal CS_OUT to obtain the rising edge, so as to obtain the second reference signal fault1.

Figure 9:
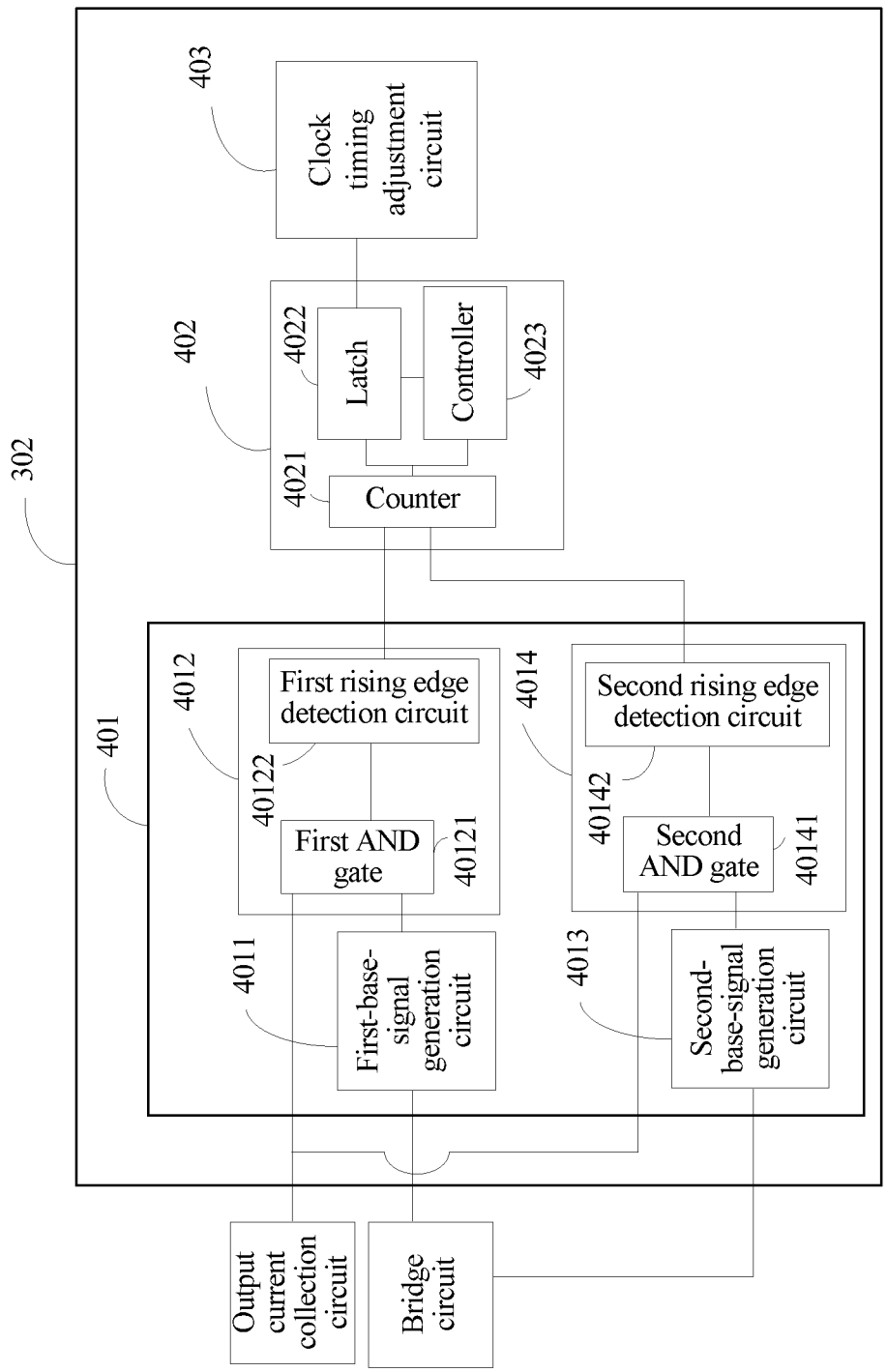
FIG. 9 is a schematic diagram of another digital power supply protection circuit according to an embodiment of the present invention.

Preferably, as shown in FIG. 9, the signal generation circuit 402 includes a counter 4021, a latch 4022, and a controller 4023.

A first input end of the counter 4021 is connected to the output end of the first logic circuit 4012, a second input end of the counter 4021 is connected to the output end of the second logic circuit 4014, and an output end of the counter 4021 is connected to input ends of both the controller 4023 and the latch 4022. Output ends of the latch 4022 are respectively connected to the controller and the clock timing adjustment circuit.

The counter 4021 is configured to receive the first reference signal, count the time duration between the rising edge of the first inceptive impulse clock timing and the rising edge of the first reference signal so as to obtain the first time duration, and send the first time duration to the controller 4023.

The latch 4022 is configured to store the second time duration, and send the second time duration to the controller 4023.

The controller 4023 is configured to compare the first time duration with the second time duration stored in the latch 4022; upon the first time duration is greater than the second time duration, generate the first disabling signal by delaying the rising edge of the first inceptive impulse clock timing for the second time duration; and send the disabling signal to the clock timing adjustment circuit.

Further, the counter 4021 is further configured to receive the second reference signal, count the time duration between the rising edge of the second inceptive impulse clock timing and the rising edge of the second reference signal so as to obtain the second time duration, and send the second time duration to the controller 4023.

The latch 4022 is further configured to store the third time duration, and send the third time duration to the controller 4023.

The controller 4023 is configured to compare the second time duration with the third time duration stored in the latch 4022; upon the second time duration is less than the third time duration, generate the second disabling signal by delaying the rising edge of the second inceptive impulse clock timing for the second time duration; send the second disabling signal to the clock timing adjustment circuit; and trigger the latch 4022 to update the stored third time duration to the second time duration.

Figure 10:
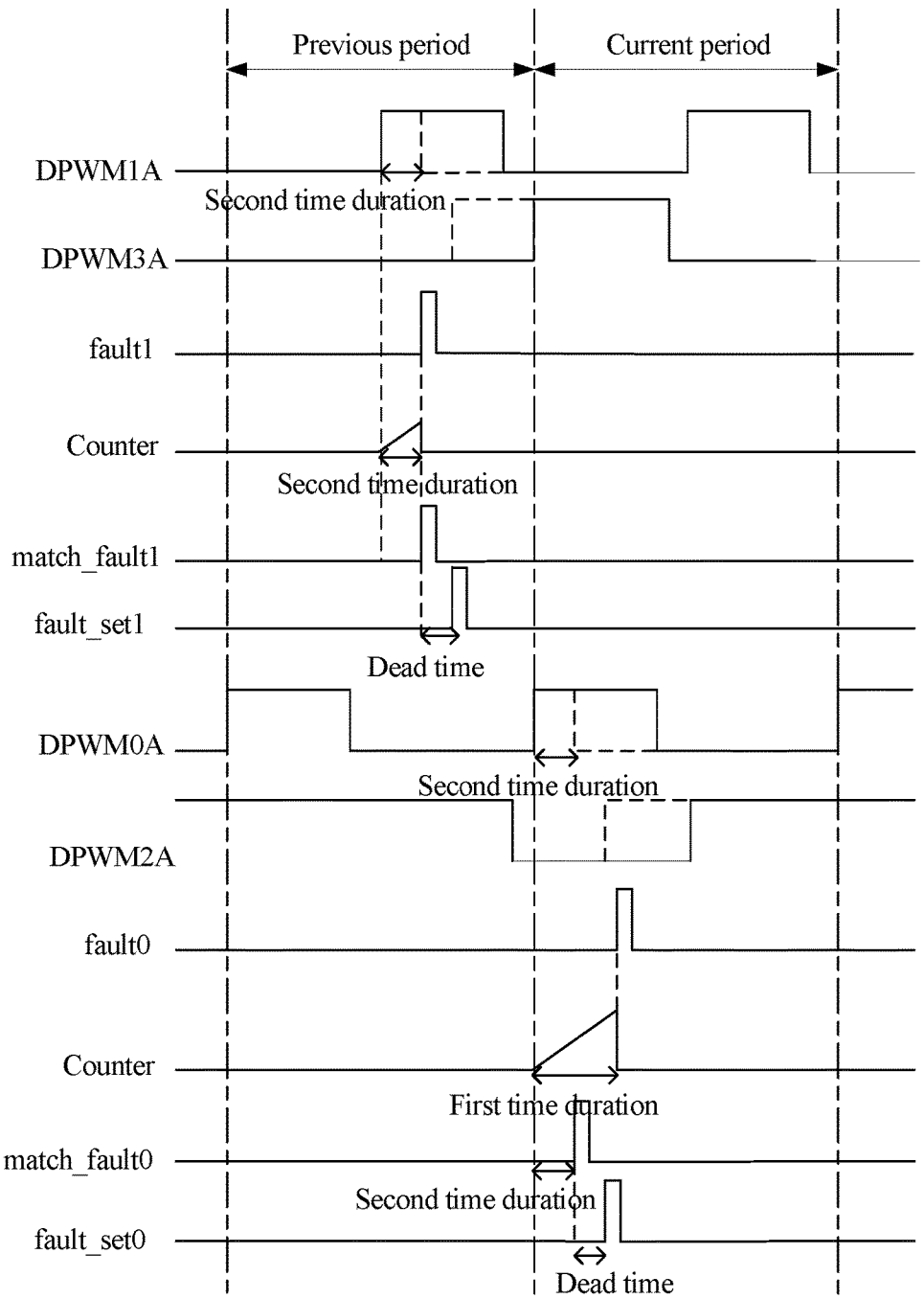
FIG. 10 is an example diagram of another inceptive impulse clock timing according to an embodiment of the present invention.

Exemplarily, as shown in FIG. 10, based on the foregoing example, the signal generation circuit 402 receives the first reference signal fault0 and the second reference signal fault1 that are output by the signal preprocessing circuit 401. The first inceptive impulse clock timing received by the signal generation circuit 402 is DPWM0A and the second inceptive impulse clock timing received by the signal generation circuit 402 is DPWM1A.

For the first reference signal fault0, the counter 4021 starts timing from the rising edge of the first inceptive impulse clock timing DPWM0A, keeps timing and stops timing at a location in which an active level occurs in the first reference signal fault0, and in this case, outputs the first time duration obtained by means of timing to the controller 4023. The controller 4023 compares the first time duration with the second time duration stored in the latch 4022, and upon the first time duration is greater than the second time duration, generates the first disabling signal match_fault0 by delaying the rising edge of the first inceptive impulse clock timing DPWM0A for the second time duration. The clock timing adjustment circuit 403 adjusts the first inceptive impulse clock timing DPWM0A from the active level to the inactive level according to the first disabling signal match_fault0, as shown in a dashed line location in the first inceptive impulse clock timing DPWM0A in FIG. 10. For the second reference signal fault1, the counter 4021 starts timing from the rising edge of the second inceptive impulse clock timing DPWM1A, keeps timing and stops timing at a location in which an active level occurs in the second reference signal fault1, and in this case, outputs the second time duration obtained by means of timing to the controller 4023. The controller 4023 compares the second time duration with the third time duration stored in the latch 4022, and upon the second time duration is less than the third time duration, triggers the latch 4022 to update the stored third time duration to the second time duration, and generates the second disabling signal match_fault1 by delaying the rising edge of the second inceptive impulse clock timing DPWM1A for the second time duration. The clock timing adjustment circuit 403 adjusts the second inceptive impulse clock timing DPWM1A from the active level to the inactive level according to the second disabling signal match_fault1, as shown in a dashed line location in the second inceptive impulse clock timing DPWM1A in FIG. 10.

It can be learned that, because the first inceptive impulse clock timing that controls the power switch that is switched on at the first time in the current period is disabled according to the second time duration, and the second inceptive impulse clock timing that controls the power switch that is switched on at the second time in the previous period is also disabled according to the second time duration, duration of an active level in the disabled first inceptive impulse clock timing is equal to duration of an active level in the disabled second inceptive impulse clock timing. For details, reference may be made to a dashed line part in the first inceptive impulse clock timing DPWM0A and a dashed line part in the second inceptive impulse clock timing DPWM1A in FIG. 10.

In addition, the clock timing adjustment circuit 403 delays the first disabling signal match_fault0 according to the dead time during working of the bridge circuit so as to obtain the first delay signal fault_set0, and adjusts the third inceptive impulse clock timing DPWM2A to the active level according to a location in which a rising edge of the first delay signal fault_set0 occurs, as shown in a dashed line location in the third inceptive impulse clock timing DPWM2A in FIG. 10. The clock timing adjustment circuit 403 further delays the second disabling signal match_fault1 according to the dead time during working of the bridge circuit so as to obtain the second delay signal fault_set1, and adjusts the fourth inceptive impulse clock timing DPWM3A to the active level according to a location in which a rising edge of the second delay signal fault_set1 occurs, as shown in a dashed line location in the fourth inceptive impulse clock timing DPWM3A in FIG. 10.

Figure 11:
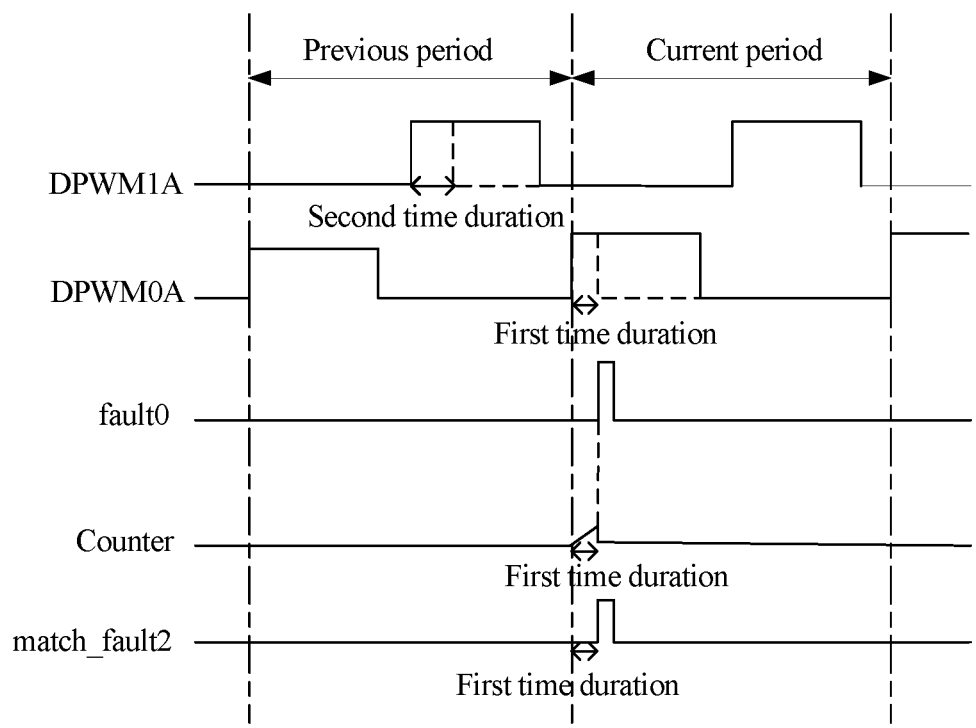
FIG. 11 is an example diagram of another inceptive impulse clock timing according to an embodiment of the present invention.

Exemplarily, as shown in FIG. 11, based on the foregoing example, the signal generation circuit 402 receives the first reference signal fault0 that is output by the signal preprocessing circuit 401, and the first inceptive impulse clock timing received by the signal generation circuit 402 is DPWM0A.

For the first reference signal fault0 the counter 4021 starts timing from the rising edge of the first inceptive impulse clock timing DPWM0A, keeps timing and stops timing at a location in which an active level occurs in the first reference signal fault0 and in this case, outputs the first time duration obtained by means of timing to the controller 4023. The controller 4023 compares the first time duration with the second time duration stored in the latch 4022, and upon the first time duration is not greater than the second time duration, generates the third disabling signal match_fault2 by delaying the rising edge of the first inceptive impulse clock timing for the first time duration. The clock timing adjustment circuit 403 adjusts the first inceptive impulse clock timing DPWM0A from the active level to the inactive level according to the third disabling signal match_fault2, as shown in a dashed line location in the first inceptive impulse clock timing DPWM0A in FIG. 11.

It can be learned that, the third disabling signal is generated according to the first time duration, and the first inceptive impulse clock timing is adjusted according to the third disabling signal, thereby ensuring that the overcurrent signal does not damage the bridge circuit.

This embodiment of the present invention provides a digital power supply protection circuit 302 that is applied to a bridge circuit and includes a signal preprocessing circuit, a signal generation circuit, and a clock timing adjustment circuit. When receiving an overcurrent signal, the signal preprocessing circuit performs preprocessing on the overcurrent signal according to a first inceptive impulse clock timing so as to obtain a first reference signal. The signal generation circuit counts time duration between a rising edge of the first inceptive impulse clock timing and a rising edge of the first reference signal so as to obtain a first time duration, and upon the first time duration is greater than a second time duration between a switching-on moment of a power switch that is switched on at the second time in a previous period and a moment when an overcurrent occurs, generates a first disabling signal by delaying the rising edge of the first inceptive impulse clock timing for the second time duration. The clock timing adjustment circuit adjusts the first inceptive impulse clock timing from the active level to an inactive level according to the first disabling signal. In this way, when an overcurrent occurs within a switch-on time duration of the power switch that is switched on at the second time in the previous period, to avoid the overcurrent from damaging the bridge circuit, an inceptive impulse clock timing that controls the power switch that is switched on at the second time in the previous period, that is, a second inceptive impulse clock timing, needs to be adjusted from the active level to an inactive level according to the second time duration. In addition, upon the overcurrent signal occurs relatively late or no overcurrent signal occurs when a power switch that is switched on at the first time is switched on in a current period, an inceptive impulse clock timing that controls the power switch that is switched on at the first time in the current period, that is, the first inceptive impulse clock timing, is adjusted from the active level to the inactive level according to the second time duration, so that the switch-on time duration of the power switch that is switched on at the second time in the previous period is equal to a switch-on time duration of the power switch that is switched on at the first time in the current period, thereby ensuring magnetic balance of a transformer, and improving reliability of the bridge circuit. In addition, the clock timing adjustment circuit further adjusts a third inceptive impulse clock timing to an active level according to a first delay signal, and adjusts a fourth inceptive impulse clock timing to an active level according to a second delay signal, so that the bridge circuit performs rectification according to an adjusted third inceptive impulse clock timing and an adjusted fourth inceptive impulse clock timing, thereby ensuring a dead time during working of the bridge circuit.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, as described in the foregoing embodiments, or may be implemented in a form of hardware in addition to a software functional unit.

When the foregoing integrated unit is implemented in a form of a software functional unit, the integrated unit may be stored in a computer-readable storage medium which is hardware. The software functional unit is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a USB flash drive, a removable hard disk, a read-only memory (Read-Only Memory, ROM for short), a random access memory (Random Access Memory, RAM for short), a magnetic disk, or an optical disc.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

The invention claimed is:

1. A digital power supply protection circuit, applied to a bridge circuit, wherein the bridge circuit comprises: a power switch that is switched on at a first time and a power switch that is switched on at a second time, the bridge circuit periodically works under control of an inceptive impulse clock timing, and each period is divided into the first half period and the second half period, wherein the power switch that is switched on at the first time is a power switch that is switched on in the first half period, the power switch that is switched on at the second time is a power switch that is switched on in the second half period, and the inceptive impulse clock timing comprises a first inceptive impulse clock timing and a second inceptive impulse clock timing; and the digital power supply protection circuit comprises:
a signal preprocessing circuit;
a signal generation circuit and
a clock timing adjustment circuit, wherein
the signal preprocessing circuit is configured to receive an overcurrent signal and the first inceptive impulse clock timing, perform preprocessing on the overcurrent signal according to the first inceptive impulse clock timing so as to obtain a first reference signal, and send the first reference signal to the signal generation circuit, wherein the first inceptive impulse clock timing is an inceptive impulse clock timing that controls the power switch that is switched on at the first time in a current period, the overcurrent signal comprises a signal that is output when an overcurrent occurs in the bridge circuit within time duration of an active level in the first inceptive impulse clock timing, and a rising edge of the first reference signal indicates a moment when the overcurrent occurs in the bridge circuit within the first inceptive impulse clock timing;
the signal generation circuit is configured to receive the first inceptive impulse clock timing, count time duration between a rising edge of the first inceptive impulse clock timing and the rising edge of the first reference signal so as to obtain a first time duration, upon the first time duration is greater than a second time duration, generate a first disabling signal by delaying the rising edge of the first inceptive impulse clock timing for the second time duration, and send the first disabling signal to the clock timing adjustment circuit, wherein the second time duration is time duration between a switching-on moment of the power switch that is switched on at the second time in a previous period and a moment when the overcurrent occurs in the bridge circuit; and
the clock timing adjustment circuit is configured to adjust the first inceptive impulse clock timing from the active level to an inactive level according to the first disabling signal, so that duration of the active level in an adjusted first inceptive impulse clock timing is equal to duration of an active level in a second inceptive impulse clock timing adjusted according to the second time duration, wherein the second inceptive impulse clock timing is an inceptive impulse clock timing that controls the power switch that is switched on at the second time in the previous period.

2. The circuit according to claim 1, wherein
the signal preprocessing circuit is further configured to receive the second inceptive impulse clock timing, perform preprocessing on the overcurrent signal according to the second inceptive impulse clock timing so as to obtain a second reference signal, and send the second reference signal to the signal generation circuit, wherein the overcurrent signal further comprises a signal that is output when an overcurrent occurs in the bridge circuit within time duration of the active level in the second inceptive impulse clock timing, and a rising edge of the second reference signal indicates the moment when the overcurrent occurs in the bridge circuit within the second inceptive impulse clock timing;

the signal generation circuit is further configured to receive the second inceptive impulse clock timing, count time duration between a rising edge of the second inceptive impulse clock timing and the rising edge of the second reference signal so as to obtain the second time duration, upon the second time duration is less than a stored third time duration, generate a second disabling signal by delaying the rising edge of the second inceptive impulse clock timing for the second time duration, send the second disabling signal to the clock timing adjustment circuit, and update the stored third time duration to the second time duration, wherein the third time duration is a switch-on time duration of the power switch that is switched on at the first time in the previous period; and
the clock timing adjustment circuit is further configured to adjust the second inceptive impulse clock timing from the active level to an inactive level according to the second disabling signal.

3. The circuit according to claim 1, wherein
the signal generation circuit is further configured to: upon the first time duration is not greater than the second time duration, generate a third disabling signal by delaying the rising edge of the first inceptive impulse clock timing for the first time duration, and send the third disabling signal to the clock timing adjustment circuit; and
the clock timing adjustment circuit is further configured to adjust the first inceptive impulse clock timing from the active level to the inactive level according to the third disabling signal.

4. The circuit according to claim 2, wherein
the clock timing adjustment circuit is further configured to delay the first disabling signal according to a dead time during working of the bridge circuit so as to obtain a first delay signal, and adjust a third inceptive impulse clock timing to an active level according to the first delay signal; and delay the second disabling signal according to the dead time during working of the bridge circuit so as to obtain a second delay signal, and adjust a fourth inceptive impulse clock timing to an active level according to the second delay signal, wherein the third inceptive impulse clock timing is an inceptive impulse clock timing that controls a first synchronous rectifier corresponding to the power switch that is switched on at the first time in the bridge circuit, and the fourth inceptive impulse clock timing is an inceptive impulse clock timing that controls a second synchronous rectifier corresponding to the power switch that is switched on at the second time in the bridge circuit.

5. The circuit according to claim 1, wherein the signal preprocessing circuit comprises a first-base-signal generation circuit and a first logic circuit, wherein
the first-base-signal generation circuit is configured to receive the first inceptive impulse clock timing, generate a first base signal according to the first inceptive impulse clock timing, and send the first base signal to the first logic circuit; and
the first logic circuit is configured to receive the overcurrent signal, perform an AND operation on the first base signal and the overcurrent signal to obtain a rising edge so as to obtain the first reference signal, and send the first reference signal to the signal generation circuit.

6. The circuit according to claim 2, wherein the signal preprocessing circuit comprises a second-base-signal generation circuit and a second logic circuit, wherein the second-base-signal generation circuit is configured to receive the second inceptive impulse clock timing, generate a second base signal according to the second inceptive impulse clock timing, and send the second base signal to the second logic circuit; and the second logic circuit is configured to receive the overcurrent signal, perform an AND operation on the second base signal and the overcurrent signal to obtain a rising edge so as to obtain the second reference signal, and send the second reference signal to the signal generation circuit.

7. The circuit according to claim 1, wherein the signal generation circuit comprises a counter, a latch, and a controller, wherein the counter is configured to receive the first reference signal, count the time duration between the rising edge of the first inceptive impulse clock timing and the rising edge of the first reference signal so as to obtain the first time duration, and send the first time duration to the controller;

the latch is configured to store the second time duration, and send the second time duration to the controller; and the controller is configured to: upon the first time duration is greater than the second time duration, generate the first disabling signal by delaying the rising edge of the first inceptive impulse clock timing for the second time duration, and send the disabling signal to the clock timing adjustment circuit.

8. The circuit according to claim 2, wherein the signal generation circuit comprises a counter, a latch, and a controller, wherein the counter is configured to receive the second reference signal, count the time duration between the rising edge of the second inceptive impulse clock timing and the rising edge of the second reference signal so as to obtain the second time duration, and send the second time duration to the controller;

the latch is configured to store the third time duration, and send the third time duration to the controller; and the controller is configured to: upon the second time duration is less than the third time duration, generate the second disabling signal by delaying the rising edge of the second inceptive impulse clock timing for the second time duration, send the second disabling signal to the clock timing adjustment circuit, and trigger the latch to update the stored third time duration to the second time duration.

9. A digital power supply, comprising:

a bridge circuit comprising: a power switch that is switched on at a first time and a power switch that is switched on at a second time, wherein the bridge circuit periodically works under control of an inceptive impulse clock timing, and each period is divided into the first half period and the second half period, wherein the power switch that is switched on at the first time is a power switch that is switched on in the first half period, the power switch that is switched on at the second time is a power switch that is switched on in the second half period, and the inceptive impulse clock timing comprises a first inceptive impulse clock timing and a second inceptive impulse clock timing; and a digital power supply protection circuit, comprising:
a signal preprocessing circuit;
a signal generation circuit; and
a clock timing adjustment circuit, wherein the signal preprocessing circuit is configured to receive an overcurrent signal and the first inceptive impulse clock timing, perform preprocessing on the overcurrent signal according to the first inceptive impulse clock timing so as to obtain a first reference signal, and send the first reference signal to the signal generation circuit, wherein the first inceptive impulse clock timing is an inceptive impulse clock timing that controls the power switch that is switched on at the first time in a current period, the overcurrent signal comprises a signal that is output when an overcurrent occurs in the bridge circuit within time duration of an active level in the first inceptive impulse clock timing, and a rising edge of the first reference signal indicates a moment when the overcurrent occurs in the bridge circuit within the first inceptive impulse clock timing, the signal generation circuit is configured to receive the first inceptive impulse clock timing, count time duration between a rising edge of the first inceptive impulse clock timing and the rising edge of the first reference signal so as to obtain a first time duration, upon the first time duration is greater than a second time duration, generate a first disabling signal by delaying the rising edge of the first inceptive impulse clock timing for the second time duration, and send the first disabling signal to the clock timing adjustment circuit, wherein the second time duration is time duration between a switching-on moment of the power switch that is switched on at the second time in a previous period and a moment when the overcurrent occurs in the bridge circuit, and the clock timing adjustment circuit is configured to adjust the first inceptive impulse clock timing from the active level to an inactive level according to the first disabling signal, so that duration of the active level in an adjusted first inceptive impulse clock timing is equal to duration of an active level in a second inceptive impulse clock timing adjusted according to the second time duration, wherein the second inceptive impulse clock timing is an inceptive impulse clock timing that controls the power switch that is switched on at the second time in the previous period;

wherein at least one of the adjusted first inceptive impulse clock timing or the adjusted second inceptive impulse clock timing is sent from the digital power supply protection circuit to the bridge circuit.

10. The digital power supply according to claim 9, wherein the digital power supply further comprises an output current collection circuit, wherein the output current collection circuit is configured to collect an output current of the bridge circuit, determine the overcurrent signal according to the output current of the bridge circuit, and send the overcurrent signal to the digital power supply protection circuit.

* * * * *